Patented Oct. 27, 1936

2,058,394

UNITED STATES PATENT OFFICE 2,058,394

RESINOUS COMPOSITIONS

James Augustus Arvin, Wilmington, Del., assignor to E. I. du Pont de Nemours & Company, Wilmington, Del., a corporation of Delaware No Drawing. Application May 3, 1934, Serial No. 723,795

9 Claims. (Cl. 260—2)

This invention relates to resinous compositions and more particularly to new resins obtainable from polyhydric phenols and certain inorganic polyhalogen compounds.

The new synthetic resins which are the subject of this invention are prepared in one way from an inorganic polybasic acid halide and a particular type of phenol, viz., a polyhydric phenol having its phenolic hydroxyl groups attached to different non-condensed carbocyclic nuclei. The present resin-forming reaction is a modified form of esterification, and the resins of this invention are of an ester-type, not phenol-aldehyde or modified phenol-aldehyde resins. This invention therefore is not concerned with the phenol-aldehyde resin-forming reaction and has no relation to the extensive art dealing with the formation of such resins, or with their after-treatment. In the prior art processes are described in which phenols are combined with aldehydes in the presence of various halogen compounds; such processes have no relation to the present invention in which aldehydes are never employed as resin-forming ingredients. Methods are also known in the resin art for treating partially or completely condensed phenol-aldehyde resins with various organic halogen compounds; such processes yield modified phenol-aldehyde resins and not ester resins of the present type. The resins of the present invention are also wholly dissimilar in constitution and properties from the crystalline products of definite formula obtained by known methods of combining certain polyhydric phenols and inorganic polybasic acid halides.

This invention has as an object the production of new and valuable synthetic resins and compositions containing them. Another object is a method for preparing these resins. Another object is the preparation of synthetic resins which are soluble, fusible, and which can be blended with cellulose derivatives and oils, and which do not gel upon prolonged heat-treatment. Other objects will appear hereinafter.

The above and other objects are accomplished by reacting, usually with heat-treatment, polyhydric phenols of the kind mentioned above and inorganic polybasic acid halides, especially halides of the general formula $RMX_n$, where R is either oxygen, sulfur, selenium, or tellurium, M is either phosphorus, arsenic, antimony, aluminum or bismuth, X is a halogen, e. g. chlorine, bromine or iodine, and $n$ is a whole number greater than 1, the value of $n$ being fixed by the valence of M. Carbonic acid is not included by the term "inorganic polybasic acid".

The practice of my invention in its broader aspect consists in heating the polyhydric phenol with a polybasic inorganic acid halide in the presence of a suitable inert solvent for a sufficient time to bring about the desired degree of condensation. As an alternative, but less desirable method of practicing the invention, the polyhydric phenol and the polybasic inorganic acid halide are simply brought into contact with each other under suitable temperatures for a sufficient time to bring about the desired degree of condensation. A still further modification of the procedure of the present invention consists in suspending the alkali salt of the polyhydric phenol in a suitable inert medium, adding thereto the polybasic inorganic acid halide, and heating the mixture to bring about the desired degree of condensation. The resins of this invention can also be made by ester interchange which consists in heating an alkyl or aryl ester of the inorganic acid with the polyhydric phenol, preferably in the presence of an alcoholysis catalyst (e. g. lime, litharge, alcoholates of alkali and alkaline earth metals, sodium hydroxide, etc.), usually with the removal of at least a part of the monohydric alcohol or phenol as it is formed. It is preferred to use a lower alkyl ester of the inorganic acid because the alcohol formed as a by-product is more readily removed by volatilization. Prolonged contact of the alcohol or phenol (which in nearly all cases is monohydric) with the remaining constituents will cause the alcohol or phenol to enter into resin formation and the desired degree of resinification may be prevented. As pointed out below, this "holding" action of monohydric alcohol or phenol, however, is often desirable to prevent formation of infusible, insoluble resins, but the use in this way of the entire amount of the phenol or alcohol obtained as a by-product of the alcoholysis of the inorganic acid ester will generally exert too great a retarding action.

The resins produced as in the preceding paragraph frequently become insoluble and infusible upon prolonged heat-treatment. I have found, however, that by incorporating a monohydric phenol in the reaction mixture of the processes described above resins are obtained which are soluble, fusible, miscible with cellulose derivatives, and which will not gel upon prolonged heat-treatment. The monohydric phenol acts as a holding agent. Other materials besides monohydric phenols also act as holding agents for the resins of this invention; these include monohydric alcohols, lactic acid, castor oil, ricinoleic acid, etc. The monohydric alcohol or phenol may be introduced in the free state or, as pointed out previously, it may be obtained as a by-product from the alcoholysis of an alkyl, aryl, or aralkyl ester of the inorganic polybasic acid.

For some purposes, the properties of my new resins may be advantageously affected by replacing a portion of the polyhydric phenol with a polyhydric alcohol such as glycerol, polyglycerols, ethylene glycol, propylene glycol, amylene glycol, hexamethylene glycol, decamethylene glycol, and the like.

The polybasic inorganic acid halide may be substituted in part by an organic monobasic acid or acid halide such as acetyl chloride, propionyl chloride, stearoyl chloride, benzoyl chloride, the halides of castor oil acids or other fatty oil acids, etc. In some cases, it is desirable to substitute in part the polybasic inorganic acid halide with a polybasic organic acid or acid halide such as phthalyl chloride, succinyl chloride, naphthalyl chloride, and the like. The polybasic inorganic acid halide may also be replaced in part by an inorganic monobasic acid halide.

The following examples are illustrative of the methods for carrying out my invention:

Example I

| | Grams |
|---|---|
| Di(4-hydroxyphenyl)dimethylmethane | 142.5 |
| Phenol | 25.0 |
| Phosphorus oxychloride | 71.5 |
| Xylene | 100.0 |
| Total | 339.0 |

The di(4-hydroxyphenyl)dimethylmethane, phenol, and xylene are mixed in a flask fitted with a reflux condenser, the mixture heated to reflux, the phosphorus oxychloride added in the course of 1½ hours, and the solution further refluxed for 18½ hours. The solution is then steam distilled to remove the solvent and unreacted phenol, and the product dried by vacuum distillation. The product obtained is a clear homogeneous balsamic resin, soluble in ester solvents, and which can be combined with nitrocellulose and other cellulose derivatives in the formation of valuable coating compositions.

Example II

| | Grams |
|---|---|
| Di(4-hydroxyphenyl)dimethylmethane | 342 |
| Xylene | 342 |
| Phosphorus oxychloride | 153 |
| Total | 837 |

The di(4-hydroxyphenyl)dimethylmethane and xylene are mixed in a flask fitted with a reflux condenser, the mixture refluxed, the phosphorus oxychloride added to the boiling solution in the course of twenty minutes, and the mixture refluxed for 24½ hours. The solution is then steam distilled, and solvent removed from the residue by heating it at 100–105° C. for 24 hours, preferably in vacuo. The product obtained is a light-brown, somewhat brittle resin.

Example III

| | Grams |
|---|---|
| Di(4-hydroxyphenyl)dimethylmethane | 239.4 |
| Thiophosphoryl chloride | 113.0 |
| Phosphorus trichloride | 2.3 |
| Xylene | 240.0 |
| Total | 594.7 |

The di(4-hydroxyphenyl)dimethylmethane, phosphorus trichloride and xylene are mixed in the cold, heated to reflux, the thiophosphoryl chloride added in the course of 30 minutes, and the mixture refluxed for about 2¼ hours. At this point the solution is colorless and viscous. The product is recovered as in Example II. The trichloride is very reactive and has the unexpected effect of catalyzing the action of the less reactive thiophosphoryl chloride. This was also found to be true in the following example.

Example IV

| | Grams |
|---|---|
| Di(4-hydroxyphenyl)dimethylmethane | 152.0 |
| Phenol | 94.0 |
| Thiophosphoryl chloride | 310.0 |
| Phosphorus trichloride | 2.3 |
| Xylene | 250.0 |
| Total | 608.3 |

The di(4-hydroxyphenyl)dimethylmethane, phenol, xylene and phosphorus trichloride are mixed in a flask fitted with a reflux condenser, the mixture heated to boiling, the thiophosphoryl chloride added slowly to the boiling mixture, and the solution refluxed vigorously for 42 hours. The solution is transferred to a flat dish and solvent removed by heating in vacuo for 45 hours at 90–95° C. The resin obtained can be combined with cellulose derivatives, particularly with benzyl cellulose, to give valuable lacquers.

Although in the examples xylene has been used as the inert solvent, it is to be understood that any other inert solvents such as toluene, benzene, and the like, chlorinated hydrocarbons, etc. may be used. By "inert solvent" I mean a solvent which is substantially unreactive with either the reactants or the products of the reaction. The main criteria for selecting the solvent are those of inertness and boiling point. Generally, any inert solvent may be used, but if its boiling point is low the reaction goes slowly; on the other hand, if the solvent is too high boiling, e. g. above 185° C., then it is very difficult to remove from the resinous reaction product. As a rule, I prefer to use an inert solvent boiling between 120° C. and 150° C. The boiling point can of course be controlled by use of pressures above and below atmospheric pressure, but this is generally an unnecessary complication.

The inorganic polybasic acid halides useful in my invention are inorganic compounds having at least two halogen atoms which are readily hydrolyzable to hydroxyls, which in turn yield hydrogen ions in aqueous solution. These halides are those derived from non-metallic or atmospheric elements whose oxides are acid forming. Phosgene is excluded from this invention because it is the acid halide of an organic acid. Examples of preferred halides of this kind are those of phosphorous, sulphur and the elements of subgroups B, groups 5 and 6 in the periodic classification of the elements, namely, arsenic, antimony, bismuth, selenium, and tellurium. The most useful polyhalogens included within the group $RMX_n$ previously defined are those of the type $RPX_3$ where R is oxygen or sulphur, P is phosphorous, and X is a halogen. A suitable halide of silicon is silicon tetrachloride. Among the less desirable polyhalogen compounds are those of such elements as aluminum and bismuth.

In some cases it is desirable to use a combination of polyhalogen compounds. Thus, for example, when the polyhydric phenol is condensed with thiophosphoryl chloride it is desirable to have a small amount of a very reactive halide such as aluminum chloride or phosphorus trichloride to act as an activator for the reaction. Examples of suitable inorganic polyhalogen compounds which may be used as activators include phosphorus trichloride, phosphorus pentachloride, chlorsulfonic acid, thionyl chloride, sulfuryl chloride, arsenic trichloride, antimony trichloride, and aluminum trichloride. These compounds may be considered inorganic polybasic acid halides, and their action is probably similar to that of the preferred types RMX$_n$ and RPX$_3$, the latter simply reacting more slowly and in a manner which can be controlled. Where a polybasic acid halide which is exceedingly reactive or dangerously unstable is included in the reaction mixture the bulk of polyhalogen compound required to produce the resin should consist of the more stable kinds of polyhalogen compounds such as those of the types RMX$_n$ and especially RPX$_3$, or else the reaction should be conducted at low temperature and in high dilution.

The following additional polyhalogen compounds may also be combined with polyhydric phenols to form resins: silicon tetrachloride, hexachlordisilane, silicochloroform, titanium tetrachloride, titanium trichloride, and similar germanium compounds. Likewise, alkyl and aryl esters of silicon acids may be combined with the phenol by ester interchange. Examples of these and esters of other inorganic acids are tricresyl phosphate, tetraethyl silicate, diphenyl phosphite, dilauryl phosphate, monobenzyl thiophosphate, etc.

A wide variety of polynuclear polyhydric phenols having the phenolic hydroxyls attached to different non-condensed carbocyclic nuclei may be used as indicated by the following phenols: p,p'-dihydroxydiphenyl, di(4-hydroxyphenyl)sulfide, di(4-hydroxyphenyl)sulfone, di-(4-hydroxy-3-methylphenyl)sulfone, p,p'-dihydroxybenzophenone, etc. However, because of their non-discoloring properties, polynuclear phenols of the type

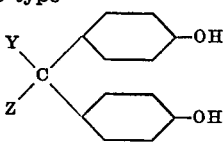

(with or without ring substituents), where Y is hydrogen or a monovalent hydrocarbon radical and Z is a monovalent hydrocarbon radical, are greatly preferred. Examples of this type of phenol are: di(4-hydroxy-3-methylphenyl)dimethylmethane, di(4-hydroxy-3-chlorophenyl)-dimethylmethane, di(4-hydroxy-3-methylphenyl)methylmethane, di(4-hydro-3-chlorophenyl)methylmethane, di(4-hydroxy-3-methylphenyl)propylmethane, di(4-hydroxy-3-methylphenyl)dipropylmethane, di(4-hydroxy-3-methylphenyl)phenylmethane, 1,1-di(4-hydroxy-3-methylphenyl)cyclohexane, di(4-hydroxy-3-chlorophenyl)methylethylmethane, and di(4-hydroxyphenyl)dimethylmethane. The non-discoloring properties of these phenols and the resins obtained therefrom are likely due to the fact that the para positions to the phenolic hydroxyls are blocked by a secondary or tertiary carbon atom, which prevents a quinoid-like degradation of the phenol to colored products. It is not desired, however, to be limited to this theory.

Polynuclear phenols of the kind described above which have their phenolic hydroxyl groups attached to different non-condensed nuclei, as distinguished from other phenols as ingredients for resins of the present type, more readily form highly polymeric resinous products instead of crystalline monomeric products. The latter type of product is frequently obtained with mononuclear phenols; this is possibly because the phenolic hydroxyls, being closer together, offer less steric hindrance to the formation of the monomeric ester.

Monohydric phenols have particular value as modifying agents for the resins of this invention because when used in partial replacement of the polyhydric phenol they function as holding agents and solubilizing agents for the resin. These monohydric phenols may be either mononuclear or polynuclear and may or may not contain other substituent groups. In general, it is preferred to add the monohydric phenols to the mixture of polyhydric phenol and polybasis inorganic acid halide, and to heat the mixture to bring about the desired degree of condensation. Examples of suitable mononuclear monohydric phenols for the purpose of this invention are as follows: phenol, o-cresol, p-cresol, p-chlorophenol, p-nitrophenol, p-tertiarybutyl phenol, p-tertiaryamyl phenol, p-tertiaryheptyl phenol, 3-methyl-6-isopropyl phenol, 1,2, 4-xylenol, cresole, guaiacol, eugenol, and pseudo-cumenol. Examples of polynuclear monohydric phenols which may be substituted in part for the polyhydric phenols include: p-hydroxydiphenyl, 2.4-dibenzyl phenol, α-naphthol, p-hydroxybenzophenone, and p-cyclohexyl phenol.

As pointed out in a previous paragraph of this specification, monohydric alcohols also function as holding agents for the resin-forming reaction. Suitable examples of monohydric alcohols include ethyl alcohol, propyl alcohol, amyl alcohol, heptyl alcohol, dodecyl alcohol, octadecyl alcohol, and the like; borneol, terpineol, benzyl alcohol, fenchyl alcohol, β-phenethyl alcohol, phenylmethylcarbinol, cinnammyl alcohol, and the like.

The resins of this invention may be combined over wide limits with cellulose derivatives, particularly with nitrocellulose and benzyl cellulose, to give lacquers having valuable properties. Examples are given below illustrating this particular feature of the invention:

*Example V*

|  | Parts |
|---|---|
| Resin of Example I | 30.0 |
| Pyroxylin | 7.5 |
| Toluol | 50.0 |
| Butyl acetate | 41.5 |
| Ethyl acetate | 15.0 |
| Butyl alcohol | 14.0 |
| Ethyl alcohol | 3.0 |
| Total | 161.0 |

Films cast from the above lacquer are clear, hard, and have excellent oil and water-resistance.

*Example VI*

|  | Parts |
|---|---|
| Resin of Example I | 5 |
| Pyroxylin | 10 |
| Toluol | 50 |
| Butyl acetate | 43 |
| Ethyl acetate | 15 |
| Butyl alcohol | 14 |
| Ethyl alcohol | 3 |
| Total | 140 |

Films cast from the above lacquer are hard, clear, and have excellent oil and water-resistance.

The foregoing two examples illustrate the wide range over which the resins of this invention may be combined with nitrocellulose to give lacquer-forming films having excellent qualities.

Resins falling within the scope of this invention may or may not be of the heat-hardening type depending upon their composition. The heat-hardening type of resin in particular may be used in the manufacture of molding plastics, either alone or in combination with other resins, pigments, etc.

Resins made in accordance with this invention can be combined with drying oils and cellulose derivatives, and thus find useful application in the manufacture of coating compositions. The resins synthesized and disclosed herein can be blended by heating, by mutual solvent, or by other means, with one or more of the following substances: cellulose derivatives, such as nitrocellulose, cellulose sulfate, cellulose acetate, cellulose aceto-propionate, cellulose propionate, cellulose isobutyrate, benzyl cellulose, ethyl cellulose, crotyl cellulose, methyl cellulose; natural resins and ester gums, such as rosin, kauri, copal, rosin glyceride and their hydrogenation products; other synthetic resins and resin-forming materials, such as metastyrene, coumarone-indene resins, amine-aldehyde resins, acrylic ester polymers, vinyl resins, casein plastics, and polyhydric alcohol-polycarboxylic acid resins; bitumens, such as asphalt; natural and synthetic waxes such as beeswax, candelilla wax, Montan wax, carnauba wax, and dodecyl stearate; and other ester-like bodies such as stearin, castor oil, hydrogenated castor oil, tricresyl phosphate, dibutyl phthalate, triethylin, animal fats and waxes and the like. To the products, combined with drying oils and/or one or more of the above enumerated substances I may add pigments, solvents, plasticizers, antoxidants, fillers, lakes, etc., as needed and desired, in accordance with methods known to the art.

As many apparently widely different embodiments of this invention may be made without departing from the spirit and scope thereof, it is to be understood that I do not limit myself to the specific embodiments thereof except as defined in the appended claims.

I claim:
1. A polyhydric phenol-inorganic polybasic acid resin comprising the reaction product of an inorganic polybasic acid halide of the formula $RPX_3$, where R is oxygen or sulphur, P is phosphorus, and X is a halogen, and a phenol of the formula

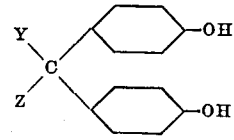

where Y is hydrogen or a monovalent hydrocarbon radical and Z is a monovalent hydrocarbon radical.

2. A polyhydric phenol-inorganic polybasic acid resin comprising the reaction product of a monohydric phenol, an inorganic polybasic acid halide of the formula $RPX_3$, where R is oxygen or sulphur, P is phosphorus, and X is a halogen, and a phenol of the formula

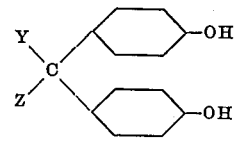

where Y is hydrogen or a monovalent hydrocarbon radical and Z is a monovalent hydrocarbon radical.

3. A process for making resins which comprises reacting a compound of the formula $RPX_3$, where R is oxygen or sulphur, P is phosphorus, and X is a halogen, with a polyhydric phenol of the formula

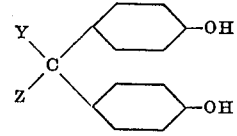

where Y is hydrogen or a monovalent hydrocarbon radical and Z is a monovalent hydrocarbon radical.

4. The resin set forth in claim 1 in which said halide is phosphorus oxychloride.

5. The resin set forth in claim 2 in which said halide is phosphorus oxychloride.

6. The resin set forth in claim 1 in which said halide is thiophosphoryl chloride.

7. The resin set forth in claim 2 in which said halide is thiophosphoryl chloride.

8. The resinous reaction product of phosphorus oxychloride and di(4-hydroxyphenyl)dimethylmethane.

9. The resinous reaction product of thiophosphoryl chloride and di(4-hydroxyphenyl)dimethylmethane.

JAMES AUGUSTUS ARVIN.

CERTIFICATE OF CORRECTION.

Patent No. 2,058,394. October 27, 1936.

JAMES AUGUSTUS ARVIN.

It is hereby certified that error appears in the printed specification of the above numbered patent requiring correction as follows: page 2, first column, lines 32, 39, 53, 59 and 72; same page, second column, lines 17 and 23 and page 3, first column, line 4 and line 8, both occurrences, for "phosphorus" read phosphorous; same page 3, first column, line 60, for the syllable "hydro" read hydroxy; and second column, line 28, for "cresole" read creosole; page 4, second column, lines 1, 16, 29, 42, 44 and line 49-50, claims 1, 2, 3, 4, 5 and 8 respectively, for "phosphorus" read phosphorous; and that the said Letters Patent should be read with these corrections therein that the same may conform to the record of the case in the Patent Office.

Signed and sealed this 16th day of February, A. D. 1937.

(Seal)

Henry Van Arsdale
Acting Commissioner of Patents.